United States Patent [19]

Pietzsch

[11] Patent Number: 4,864,121
[45] Date of Patent: Sep. 5, 1989

[54] LIGHT CURTAIN WITH PERIODIC LIGHT TRANSMITTER ARRANGEMENT

[75] Inventor: Karl Pietzsch, Geretsried, Fed. Rep. of Germany

[73] Assignee: Erwin Sick GmbH Optik-Elektronik, Fed. Rep. of Germany

[21] Appl. No.: 162,916

[22] Filed: Mar. 2, 1988

[30] Foreign Application Priority Data

Mar. 12, 1987 [DE] Fed. Rep. of Germany ....... 3707978

[51] Int. Cl.$^4$ ................... G01V 9/04; G06M 7/00
[52] U.S. Cl. .................. 250/221; 250/222.1
[58] Field of Search ............... 250/221, 222.1, 222.2, 250/553, 552; 356/386, 387, 380; 340/555-557

[56] References Cited

U.S. PATENT DOCUMENTS

| | | | |
|---|---|---|---|
| 3,810,148 | 5/1974 | Karsten et al. | 250/221 |
| 3,858,043 | 12/1974 | Sick et al. | 250/221 |
| 4,310,756 | 1/1982 | Sick et al. | 250/221 |
| 4,310,836 | 1/1982 | Stanzani | 250/221 |
| 4,656,462 | 4/1987 | Araki et al. | 340/557 |
| 4,749,853 | 6/1988 | Salim | 250/221 |

Primary Examiner—David C. Nelms
Assistant Examiner—Michael Messinger
Attorney, Agent, or Firm—Townsend and Townsend

[57] ABSTRACT

A light curtain apparatus is described which does not require a mechanically moving light deflecting element such as a mirror wheel. Instead a number of diodes (11') are arranged in a row (11) and are sequentially energized so that light from each diode in turn passes through an objective lens (12) and an aperture diaphragm and falls on a strip-like concave mirror (14). The diode row is arranged at the focal plane of the objective (12) so that the light emerging from the objective (12) is essentially parallel light. The aperture diaphragm is located in the focal plane of the strip-like concave mirror so that the parallel light emerging from it is reflected at the strip-like concave mirror (14) in a direction parallel to the optical axis (19) and focussed in a plane corresponding to the plane of the aperture diaphragm (20) which is also the focal plane of individual lenses (16') arranged in a row within the image space of the strip-like mirror (14). Thus the light emerging from the individual lenses (16') of the lens row (16) is a parallel beam of light (17) which appears to be continuously displaced parallel to itself as a result of the sequential energization of the diodes. At the far end of the monitored region (18) the parallel light can either be detected by a detector (25) located there or returned by a retroreflector (24) back to a photoreceiver (27) located between the strip-like concave mirror (14) and the aperture diaphragm (20).

12 Claims, 1 Drawing Sheet

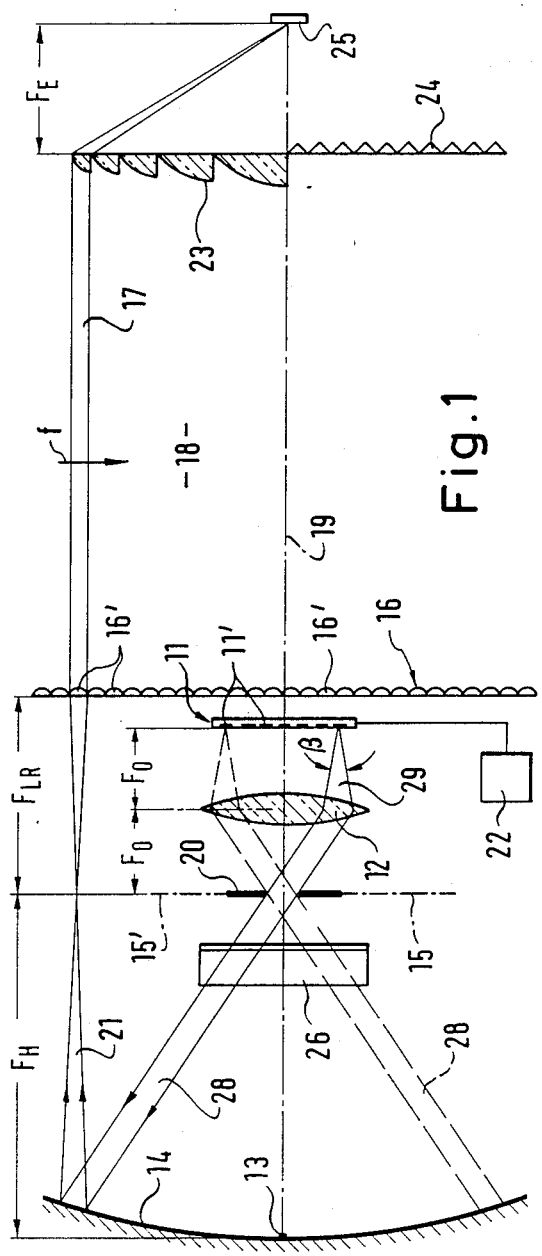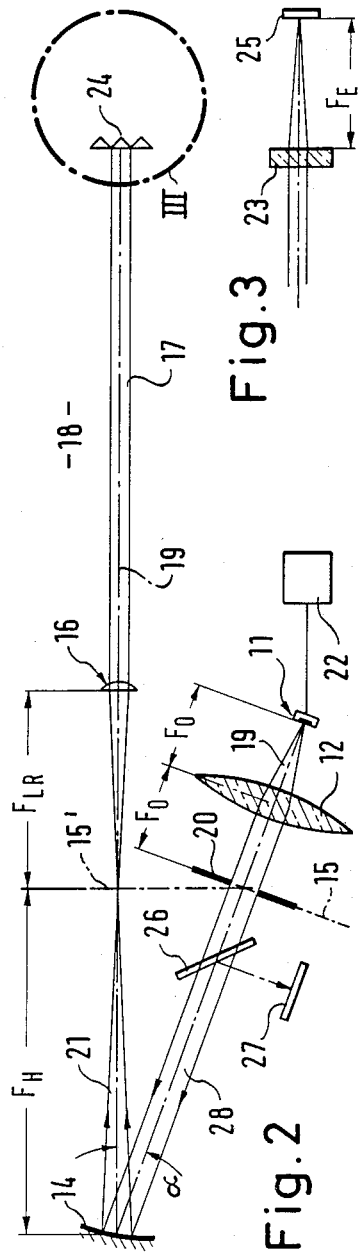

LIGHT CURTAIN WITH PERIODIC LIGHT TRANSMITTER ARRANGEMENT

BACKGROUND OF THE INVENTION

The invention relates to a light curtain apparatus comprising a periodically operating light transmitter arrangement; a first strip-like concave mirror which extends over the width of the monitored region and which receives the light beam from the light transmitter arrangement from different directions and generates scanning beams therefrom which are displaced parallel to each other and which periodically scan the monitored region; and a photoelectric light receiver arrangement which receives the light passing through the monitored region and transmits a corresponding electrical signal.

In such known light curtains a mirror wheel is generally provided which periodically deflects an incident light beam over a predetermined angular range and thus ensures the continuous scanning of the monitored region. A disadvantage of such light curtain apparatus is the requirement for a mirror wheel which rotates at high speed or for a rotating or oscillating mirror.

A light curtain apparatus with a light transmitter is already known from DE-PS No. 28 24 311 which consists of ten light emitting diodes arranged in a row alongside one another. The light emitting diodes of the light transmitter are so cyclically controlled by an electrical circuit that they are energised one after the other to transmit flashes of light. The light flashes pass essentially parallel to one another through a monitored region and impinge on a receiving concave mirror at the end of the monitored region. In this arrangement a photoelectric receiver is arranged behind a slot diaphragm at the focal point of the receiving concave mirror.

In this arrangement the concave mirror however merely serves as the receiver while a relatively long luminous diode row is necessary for the cyclical generation of the scanning beam.

If one were to reverse the transmitting and receiving optical systems in this known light curtain then the light would be transmitted from a light source arranged at the focal point of the concave mirror whereas individual receiving collimators arranged in a line would receive beams of light transmitted in bundled beam paths from the concave mirror, and would concentrate them onto a photoelectric converter, which would thereby be cyclically operated.

An optoelectronic monitoring apparatus is furthermore known from DE-PS No. 29 34 554 in which, to generate a scanning beam, a laser light beam is deflected by means of a periodically operating light deflecting device onto a receiving device which includes a strip-like Fresnel lens with a photoelectric receiver arranged at the focal point thereof. In this arrangement it is again disadvantageous that a mechanically operating light deflecting device has to be provided.

Finally, a light barrier grid is known from DE-PS No. 22 47 053 which includes a plurality of light emitting diodes of which each is arranged in the focal point of its own transmitting lens.

In this arrangement the transmitting lenses are arranged closely alongside one another, so that closely adjacent parallel monitoring light beams result.

SUMMARY OF THE INVENTION

The object of the invention is now to provide a light curtain apparatus of the initially named kind which has a stable and simple construction, and which does not require mechanically moved parts, but which nevertheless ensures an at least quasi-continuous scanning and monitoring of the monitored region. This object is satisfied by a light curtain apparatus in which the light transmitter arrangement includes a light emitting diode row or laser diode row which is periodically scanned through by an electronic circuit; in which the diode row is imaged in a telecentrically enlarged manner in the focal plane of the first concave mirror by an objective, or a second concave mirror in the focal plane of which the diode row is located, and by the first concave mirror; and in which a strip-like array of lenses, arranged spaced by its focal length from the focal plane on the opposite side of the focal plane from the first concave mirror, transmits collimated or quasi-collimated light beams into the monitored region.

The most important element of the so constructed light curtain apparatus is thus a luminescent or laser diode row in the form of a single chip. Accordingly all luminous points are stably mounted in the fixed position of a single small component and can be energised and checked individually by suitable electronics. The individual diodes are successively energised one after the other by the electronics with this energising process being periodically repeated. At any one time only one single diode of the diode row is in operation. The lens array forms an image of the telecentrically enlarged luminous points of the diode row at infinity, i.e. collimated or quasi-collimated light bundles are present in the monitored region depending on the design of the diode row.

By suitable electronic control of the individual diodes one thus creates a light curtain with a resolution which is smaller or the same as the cross-sectional dimension of the individual light beams on the monitored path. The light curtain is thus only quasi-continuous and represents a timewise pulsed light grid. It is important that no mechanically moved components are required to generate the scanning beams which are displaced parallel to themselves in the monitored region since the parallel displacement of the scanning beams is realised by the sequential energisation of the adjacent individual diodes.

In accordance with a first preferred embodiment provision is made that the objective or the second concave mirror has a diameter which is fractionally larger than the length of the diode row. In this way it is ensured that light beams emerging from the individual diodes at the end of the diode row are also fully picked up by the objective or the second concave mirror. The extent of the objective or of the second concave mirror in the direction of the diode row is determined by the angle which the light beam which is transmitted into the monitored region and which emerges from the individual diodes is intended to have. In general the extent of the objective of the second concave mirror exceeds the length of the diode row in the direction of the diode row by about 10 to 30 and in particular by approximately 20%.

In order to cut out a predetermined angular range from the light beams emerging from each individual diode a further embodiment provides that an aperture diaphragm is arranged in the focal plane of the first concave mirror on the optical axis of the objective or of the second concave mirror, and on the side of the objective or of the second concave mirror remote from the diode row, with the diameter of the aperture diaphragm being so dimensioned that the light beams transmitted by the first concave mirror have a diameter in the region of the lens array corresponding to the diameter of the individual lenses of the lens array. In other words this embodiment ensures the matching of the light beam diameter to the diameter of the individual lenses of the lens array. The resolution of the light curtain apparatus or light grid in accordance with the invention is determined by the fineness of the lens array. The smaller the individual lenses of the lens array are, the better is the resolution of the light curtain. The resolution is however restricted by the minimum required light intensity which is determined by the diameter of the individual lenses of the lens array.

A practical embodiment is characterised in that the objective or the second concave mirror is a lens strip or a concave mirror strip which extends in the direction of the diode row. In this manner the objective or the second concave mirror is ideally matched to the problematics of imaging a diode row in the focal plane of the first concave mirror. The light reception can be realised in different manners with the light curtain apparatus of the invention.

A first embodiment is so constructed that at the end of the monitored region there is provided a strip-like Fresnel lens or a strip-like receiving concave mirror with a photoreceiver provided at its focal plane.

A second embodiment envisages that a retroreflector is arranged at the end of the monitored region, that a dividing mirror is arranged between the first concave mirror and the aperture diaphragm near to the latter; and that the dividing mirror deflects the light reflected back from the retroreflector in autocollimation to a photoreceiver located to the side of the transmitted light beam, with the photoreceiver optically corresponding with respect with its size and its position to the aperture diaphragm.

In order to decouple the transmitted and received beam paths from one another, a further practical embodiment of the invention provides that in the plane (FIG. 2) perpendicular to the longitudinal extent of the diode row, the principal rays of the transmitted light beam which impinge on the first concave mirror and of the transmitted light beam reflected from the first concave mirror include an angle $\alpha$ with one another, such that the transmitted light beam reflected from the first concave mirror just passes by the aperture diaphragm, the objective or the second concave mirror and optionally the dividing mirror.

The angle $\alpha$ is approximately 20° to 30°. As a result of this construction the first concave mirror has a focal plane both in the objective side beam path and also in the lens array beam path with the two focal planes subtending an obtuse angle to one another.

The invention will now be described in the following by way of example and with reference to the drawings which show:

BRIEF DESCRIPTION OF THE DRAWINGS

FIG. 1 a schematic side view of a light curtain apparatus in accordance with the invention, FIG. 2 a plan view of the subject of FIG. 1, and FIG. 3 another embodiment of the section III—III of FIG. 2.

DETAILED DESCRIPTION OF THE PREFERRED EMBODIMENT

As seen in FIGS. 1 and 2 a light emitting diode row or laser diode row 11 is arranged at a distance $F_o$ from an objective 12 which has the strip shape extending parallel to the diode row 11 which is evident from FIGS. 1 and 2 and which makes the light beam 29 emerging from each individual diode 11' parallel. The diode row is symmetrically arranged perpendicular to the optical axis 19 of the objective 12.

An aperture diaphragm 20 is located on the opposite side of the objective 12 likewise at the distance of the focal length $F_o$ and determines the angular section $\beta$ of the light beam 29 emerging from each individual diode which is exploited for the formation of the light curtain. The size of the aperture diaphragm 20 thus determines on the diameter of the parallel light beam 28 which extends from the objective 12 to a strip-like first concave mirror 14. The first concave mirror 14 is arranged spaced apart from the aperture diaphragm 20 by its focal length $F_H$, i.e. its focal plane 15 is located substantially at the aperture diaphragm 20.

The extension of the optical axis 19 of the objective 12 meets the centerpoint 13 of the strip-like first concave mirror 14. In place of the objective 12 one can also use a corresponding second concave mirror.

The diode row 11 is connected to an electronic circuit 22 which causes the individual diodes of the diode row 11 to light up sequentially one after the other, so that a light point is generated on the diode row 11 which, as it were, migrates from one end to the other. In this way the parallel light beam 28 executes a scanning movement on the surface of the first concave mirror 14 which extends between the two extremes which are reproduced by way of example by solid and broken lines in FIG. 1. The parallel light beams 28 are concentrated in the manner which can be seen in FIG. 1 by the strip-like first concave mirror 14 as a reflected beam 21 to the focal plane 15 of the concave mirror 14 so that enlarged images of the individual diodes of the diode row 11 are present there.

The focal plane 15' is somewhat angled relative to the focal plane 15 of FIG. 2 because the first concave mirror 14 is tilted about an axis perpendicular to the plane of FIG. 2 approximately in such a manner that the principal ray of the transmitted parallel light beam 28 includes an angle $\alpha$ of approximately 20° with the main beam of the reflected beam 21.

A strip-like lens array 16 is arranged behind the focal plane 15' of the first concave mirror 14 parallel to the first concave mirror 14 with the spacing of the lens array 16 from the focal plane 15' being the same as the focal length $F_{LR}$ of the individual lenses 16' of the lens array 16. The diameter of the individual lenses 16' is matched to the diameter of the aperture diaphragm 20 in such a way that the light beams 21 each essentially illuminate one individual lens 16.

As seen in FIGS. 1 and 2 the various focal lengths $F_o$, $F_H$ and $F_{LR}$ are so selected that the diode row 11 and the lens array 16 are located at approximately the same level, so that the overall light transmitting arrangement can be comfortably accommodated in a common housing.

From the lens array 16 there emerges into the monitored region 18 located behind it, a parallel scanning beam 17 which extends perpendicular to the plane of the lens array 16 and which quasi-continuously sweeps over the monitored region 18 in the direction of the arrow f. In actual fact the scanning beam 17 which is present at each instant is in each case generated by a single one of the individual diodes 11' of the diode row 11. Thus in actual fact, there is a discontinuous further switching from one scanning beam 17 to the next adjacent one. However, when the dimension for each individual scanning beam 17 is kept small as possible, this amounts to a quasi-continuous scanning process.

As shown in the representation in the upper half of FIG. 1 and in FIG. 3 a Fresnel lens 23 can be located at the end of the monitored region which is likewise of strip-like construction. The Fresnel lens concentrates the received light onto a photoreceiver 25 which is arranged spaced from the Fresnel lens 23 by a distance equal to the focal length $F_E$ of the latter.

In place of the Fresnel lens one could however also provide a strip-like concave mirror with the photoreceiver 25 then being arranged on the opposite side to that shown in FIG. 1. The electrical output signal of the photoreceiver 25 can for example be used to determine whether the monitored path 18 has been interrupted by an article.

In accordance with a further embodiment which is shown in the lower half of FIG. 1 and in FIG. 2 one can also provide a strip-like retroreflector 24 at the end of the monitored region which reflects the incident light back on itself so that it passes in autocollimation via the strip-like first concave mirror 14 to a dividing mirror 26 which is arranged between the first concave mirror 14 and the aperture diaphragm 20 close to the latter, in the parallel light beam 28, preferably at an angle of 45°. The dividing mirror 26 reflects the light which is reflected back by the retroreflector 24 to a photoreceiver 27. The photoreceiver 27 is optically arranged at the position of the aperture diaphragm 20 and has essentially the same area as the aperture of the aperture diaphragm 20. The electrical signal of the photoreceiver 27 can likewise be exploited to determine interruption of the monitored region.

A further advantage of the invention resides in the fact that the diode row, which is already adjusted in itself merely needs to be adjusted as a whole relative to the other optical components.

I claim:

1. Light curtain apparatus comprising a periodically operating light transmitter arrangement;
a first-like concave mirror which extends over the width of the monitored region and which receives the light beam from the light transmitter arrangement from different directions and generates scanning beams therefrom which are displaced parallel to each other and which periodically scan the monitored region;
a photoelectric light receiver arrangement which receives the light passing through the monitored region and transmits a corresponding electrical signal, characterized in that the light transmitter arrangement includes a light emitting diode row or laser diode row (11) which is periodically scanner through by an electronic circuit (22), in that the diode row is imaged in a telecentrically enlarged manner in the focal plane (15) of the first concave mirror (14) by an objective (12) or a second concave mirror in the focal plane of which the diode row is located, and by the first concave mirror (14); in that a strip-like array of lenses (16) arranged, spaced by its focal length ($F_{LR}$) from the focal plane (15) on the opposite side of the focal plane from the first concave mirror (14), transmits collimated or quasi-collimated light beams (17) into the monitored region (18); and in that an aperture diaphragm (20) is arranged in the focal plane (15) of the first concave mirror (14) on the optical axis (19) of the objective (12) or of the second concave mirror, and on the side of the objective or on the second concave mirror remote from the diode row (11), with the diameter of the aperture diaphragm (20) being so dimensioned that the light beams transmitted by the first concave mirror (14) have a diameter in the region of the lens array (16) corresponding to the diameter of the individual lenses (16') of the lens array (16).

2. Light curtain apparatus in accordance with claim 1, characterised in that the objective (12) or the second concave mirror has a diameter which is fractionally larger than the length of the diode row (11).

3. Light curtain in accordance with claim 1, characterised in that the objective (12) or the second concave mirror is a lens strip or a concave mirror strip which extends in the direction of the diode row (11).

4. Light curtain in accordance with claim 1, characterised in that a strip-like Fresnel lens (23) or a strip-like concave receiving mirror is arranged at the end of the monitored region (18), with a photoreceiver (25) being provided in its focal plane.

5. Light curtain in accordance with claim 1, characterised in that a retroreflector is arranged at the end of the monitored region (18); in that a dividing mirror (26) is arranged between the first concave mirror (14) and the aperture diaphragm (20) near to the latter; and in that the dividing mirror (26) deflects the light reflected back from the retroreflector (24) in autocollimation to a photoreceiver (27) located to the side of the transmitted light beam (28), with the photoreceiver (27) optically corresponding with respect with its size and its position to the aperture diaphragm 6. Light curtain apparatus in accordance with claim 1, characterised in that in the plane (FIG. 2) perpendicular to the longitudinal extent of the diode row (11), the principal rays of the transmitted light beam (18) which impinge on the first concave mirror (14) and of the transmitted light beam (21) reflected from the first concave mirror (14) include an angle α with one another, such that the transmitted light beam (21) reflected from the first concave mirror (14) just passes by the aperture diaphragm (20), the objective (12) or the second concave mirror and optionally the dividing mirror (26).

7. Light curtain apparatus comprising a periodically operating light transmitter arrangement;
a first-light concave mirror which extends over the width of the monitored region and which receives the light beam from the light transmitter arrangement from different directions and generates scanning beams therefrom which are displaced parallel to each other and which periodically scan the monitored region;
a photoelectric light receiver arrangement which receives the light passing through the monitored region and transmits a corresponding electrical signal, characterized in that the light transmitter arrangement includes a light emitting diode row or laser diode row (11) in the form of a single chip which is periodically scanned through by an electronic circuit (22), in that the diode row is imaged in a telecentrically enlarged manner in the focal plane (15') of the first concave mirror (14) by an objective (12) or a second concave mirror in the focal plane of which the diode row is located, and by the first concave mirror (14); and in that a strip-like array of lenses (16) arranged spaced by its focal length ($F_{LR}$) from the focal plane (15) on the opposite side of the focal plane from the first concave mirror (14), transmits collimated or quasi-collimated light beams (17) into the monitored region (18); and in that an aperture diaphragm (20) is arranged in the focal plane (15) of the first concave mirror (14) on the optical axis (19) of the objective (12) or of the second concave mirror, and on the side of the objective or on the second concave mirror remote from the diode row (11), with the diameter of the aperture diaphragm (20) being so dimensioned that the light beams transmitted by the first concave mirror (14) have a diameter in the region of the lens array (16) corresponding to the diameter of the individual lenses (16) of the lens array (16).

8. Light curtain apparatus in accordance with claim 7, characterized in that the objective (12) or the second concave mirror has a diameter which is fractionally larger than the length of the diode row (11).

9. Light curtain in accordance with claim 7, characterized in that the objective (12) or the second concave mirror is a lens strip or a concave mirror strip which extends in the direction of the diode row (11).

10. Light curtain in accordance with claim 7, characterized in that a strip-like Fresnel lens (23) or a strip-like concave receiving mirror is arranged at the end of the monitored region (18), with a photoreceiver (25) being provided in its focal plane.

11. Light curtain in accordance with claim 7, characterized in that retroreflector is arranged at the end of the monitored region (18); in that a dividing mirror (26) is arranged between the first concave mirror (14) and the aperture diaphragm (20) near to the latter; and in that the dividing mirror (36) deflects the light reflected back from the retroreflector (24) in autocollimation to a photoreceiver (27) located to the side of the transmitted light beam (28), with the photoreceiver (27) optically corresponding with respect with its size and its position to the aperture diaphragm (20).

12. Light curtain apparatus in accordance with claim 7, characterized in that in the plane (FIG. 2) perpendicular to the longitudinal extent of the diode row (11), the principal rays of the transmitted light beam (18) which impinge on the first concave mirror (14) and of the transmitted light beam (21) reflected from the first concave mirror (14) include an angle $\alpha$ with one another, such that the transmitted light beam (21) reflected from the first concave mirror (14) just passes by the aperture diaphragm (20), the objective (12) or the second concave mirror and optionally the dividing mirror (26).

* * * * *

UNITED STATES PATENT AND TRADEMARK OFFICE
CERTIFICATE OF CORRECTION

PATENT NO. : 4,864,121
DATED : September 5, 1989
INVENTOR(S) : KARL PIETZSCH

It is certified that error appears in the above-identified patent and that said Letters Patent is hereby corrected as shown below:

In the Claims

Claim 1, column 5, line 60, delete "scanner" and insert --scanned--.

Claim 1, column 5, line 63, delete "(15)" and insert --(15')--.

Claim 1, column 6, line 1, delete "(15)" and insert --(15')--.

Claim 5, column 6, line 39, insert "(20)." after "diaphragm".

Claim 7, column 7, line 6, delete "(15)" and insert --(15')--.

Claim 7, column 7, line 23, delete "(16)" and insert --(16')--.

UNITED STATES PATENT AND TRADEMARK OFFICE
CERTIFICATE OF CORRECTION

PATENT NO. : 4,864,121

DATED : September 5, 1989

INVENTOR(S) : Karl Pietzsch

It is certified that error appears in the above-identified patent and that said Letters Patent is hereby corrected as shown below:

Claim 11, column 8, line 13, delete "(36)" and insert --(26)--.

Signed and Sealed this

Third Day of July, 1990

*Attest:*

HARRY F. MANBECK, JR.

*Attesting Officer*

*Commissioner of Patents and Trademarks*